April 28, 1936.      W. T. BALLOU      2,039,051
IGNITION GAUGE
Original Filed June 28, 1929
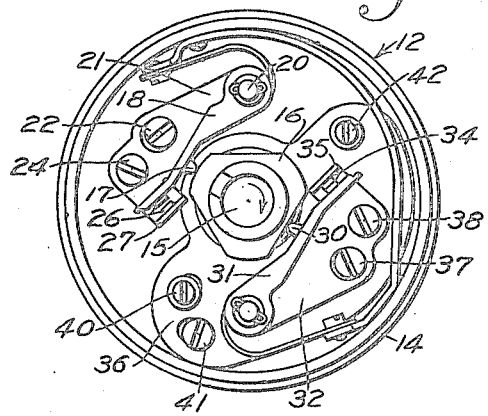
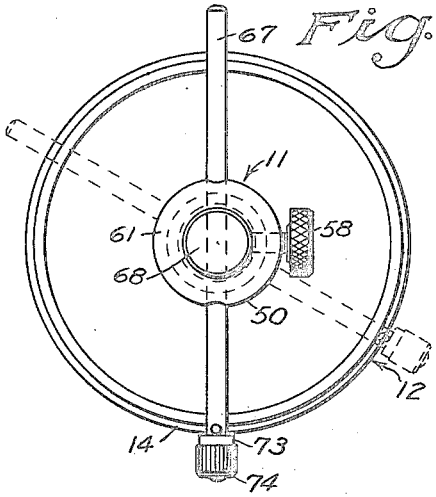
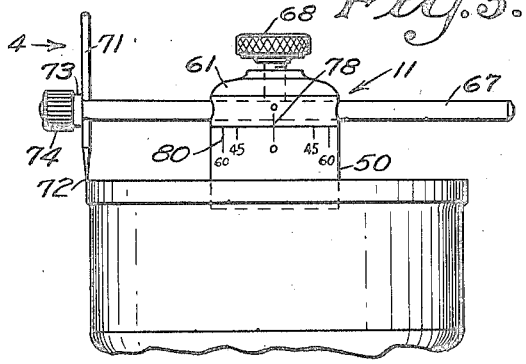
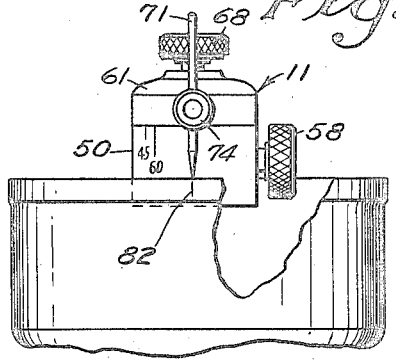
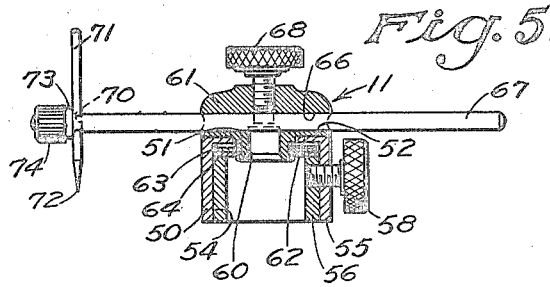
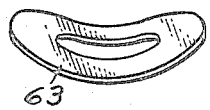
INVENTOR:
Walter T. Ballou,
BY
ATTORNEY.

Patented Apr. 28, 1936

2,039,051

UNITED STATES PATENT OFFICE 2,039,051

IGNITION GAUGE

Walter T. Ballou, Los Angeles, Calif.

Application June 28, 1929, Serial No. 374,444
Renewed October 2, 1935

17 Claims. (Cl. 116—114)

My invention relates to a gauge for measuring the rotation of a shaft, which gauge finds particular utility as a device for synchronizing the breaker points on the distributor head of an automobile.

Certain types of distributor heads employ a double set of breaker points which are operated by a single cam. It is necessary to accurately synchronize these sets of points so that they are alternately opened at equal degrees of rotation of the cam.

My invention is directed to a gauge which may be secured to a shaft driving the cam to permit accurate gauging of the rotation thereof for synchronizing the setting of the breaker points.

It is an object of my invention to provide a gauge of the above class which has a structure permitting accurate determination of the rotation of the shaft.

An object is to provide a gauge which may be secured to a shaft and operated without reference to any predetermination markings on the shaft or distributor head.

Another object is to provide a gauge which may be used with equal facility on distributor heads for automobiles having any number of cylinders.

It is also an object of my invention to provide a gauge which may be secured to distributor heads having different sizes of shafts.

Other objects reside in the particular construction of the preferred form of my invention which makes possible accurate determination of the rotation of the shaft.

Referring to the drawing:

Fig. 1 is a plan view of a distributor head to which a gauge of my invention may be applied for synchronizing purposes.

Fig. 2 is a plan view showing a gauge of my invention applied to the distributor head shown in Fig. 1.

Fig. 3 is a side view of the device shown in Fig. 2.

Fig. 4 is a side view taken as indicated by the arrow 4 in Fig. 3.

Fig. 5 is a partial sectional view taken of my device as viewed in Fig. 3.

Fig. 6 is a perspective view of a special washer used in my invention.

A gauge 11 of my invention as shown in Figs. 2 to 5 inclusive is adapted to be applied for synchronizing purposes to a distributor head 12 of the type shown in Fig. 1. This is a well known type of distributor head and no claims are made to it; however, I will describe the essential parts for completeness.

The distributor head 12 consists essentially of a cup-shaped body or box 14 journalling a vertical shaft 15, the upper end of which extends inside the annular upstanding wall of the body 14 and carries a cam 16 which has three lobes for a six-cylinder engine, four lobes for an eight-cylinder engine, etc. Engaging the external surface of the cam 16 is a rubbing block or cam follower 17 carried by a breaker arm 18 which is pivotally supported on a pin 20 secured to a base 21, the base 21 being adjustably secured to the body 14 by an adjusting screw 22 and a clamping screw 24. The arm 18 carries one of a pair of breaker points 26, the other being carried by a post 27 formed on the base 21 so that contact between the breaker points 26 is broken when the rubbing block 17 is raised on a lobe of the cam 16 as shown in Fig. 1. The breaker points 26 and associated apparatus are termed the stationary breaker points to distinguish them from a similar arrangement of movable breaker points which are placed diametrically opposite thereto and comprise a rubbing block 30 on an arm 31 pivotally secured to a base 32, the arm 31 carrying one of a pair of breaker points 34, the other being carried by a post 35 formed on the base 32.

The base 32 is secured to an adjusting block 36 by an adjusting screw 37 and a clamping screw 38, the adjusting block 36 in turn being secured to the body 14 by a clamping screw 40 and adjusting screws 41 and 42 which pass through slotted openings in the adjusting block 36 to permit the movable contact points 34 to be rotated about the shaft 15 for synchronizing the stationary breaker points 26 and the movable breaker points 34.

The gauge 11 of my invention comprises a gauging head which includes a cylindrical body 50 in the upper end of which is a bore 51 opening on an upper face 52 of the body 50 and in the lower end of which is a counterbore 54 opening on a lower face 55. The counterbore 54 is of a size to receive the largest sizes of shaft used on distributor heads with which my device is to be used. A bushing 56 is provided for fitting the counterbore 54 to the shaft 15 when the shaft 15 is smaller than the largest with which my device is to be used. Various other bushings are provided for adapting the counterbore to different sizes of shafts. Threaded in the body 50 is a set screw 58 for securing the body 50 to the shaft 15. The bore 51 rotatably receives a depending pin 60 on a cap 61 which has a lower face slidably engaging the upper face 52 of the body 50. Engaging a shoulder 62 formed in the body 50 between the bore 51 and the counterbore 54 is a special spring washer 63, a perspective view of which is shown in Fig. 6.

The spring washer 63 is compressed against the shoulder 62 by an ordinary washer 64 which is retained in place by the lower upset end of the pin 60, thus providing friction means for resisting rotation between the body 50 and the cap 61. In the cap 61 is a horizontal transverse opening 66 which slidably receives a cylindrical arm 67, the arm 67 being clamped in position by a vertical set screw 68 threaded in an opening in the cap 61. Near an end of the arm 67 is a transverse opening 70 which slidably receives a cylindrical pointer 71 having a sharpened end 72, the pointer 71 being clamped in position by a washer 73 forced into an engagement therewith by a nut 74 threaded on the end of the arm 67. The arm 67 and the pointer 71 constitute a pointer part or pointer means of my invention. On a side wall of the cap 61 near the lower face thereof is a zero or indicator gauge mark 78 which coincides with similar gauge marks 80 on the body 50 upon rotation of the cap 61 relative to the body 50, the gauge marks 80 being placed at a zero or starting point and at 45 degrees and 60 degrees either side of zero.

In the operation of my device the shaft 15 is inserted in the counterbore 54 and secured in place by clamping the set screw 58. The breaker points 26 and 34 are adjusted in a well known manner for the proper amount of opening when opened by the lobes on the cam 16. The shaft 15 is then rotated in the customary direction, which in the distributor head as shown in Fig. 1 is clockwise as viewed from above, until the stationary points 26 just open. With the shaft 15 in this position the cap 61 is rotated until the zero marks on the cap 61 and body 50 coincide as shown in Fig. 3.

The pointer 71 is then adjusted by loosening the set screw 68 and nut 74 so that the sharpened end 72 of the pointer 71 is closely adjacent the top peripheral edge of the body 50 as shown in Figs. 3 and 4. The pointer 71 is clamped in position and a mark 82 as shown in Fig. 4 is made on the body 14 of the distributor head in alignment with the pointer 71. The mark 82 constitutes a mark part of my invention and in conjunction with the pointer part and cap 61 constitutes a rotation indicating means of my invention. The cap 61 is then rotated in a direction reverse to the rotation of the shaft 15 a distance of 45 degrees for eight-cylinder engines or 60 degrees for six-cylinder engines, this amount of rotation being determined when the zero mark on the cap 61 coincides with the 45 or 60 degree mark on the body 50. The shaft 15 is then rotated in the customary direction until the end 72 of the pointer 71 is aligned with the mark 82. The movable breaker points 34 are then adjusted by loosening the screws 40 and 42 and rotating the adjusting screw 41 for adjusting the block 36 until the points 34 just open. The breaker points 26 and 34 are now synchronized so that the engine will fire at the proper time and the gauge 11 may then be removed.

By providing gauge marks on the outer surface of the cap 61 and body 50 it is possible to accurately gauge relative rotation between the cap 61 and the body 50 and by providing an adjustable pointer 71 which may be adjusted to closely approach the periphery of the body 14 it is possible to accurately gauge rotation of the arm 67 relative to the body 14 of the distributor 12.

Although only 45 and 60 degree marks are shown in the drawing, which marks adapt the gauge 11 for use on six and eight-cylinder engines, additional marks may be made for cars of any number of cylinders. Furthermore, the gauge marks may be stamped with the number of cylinders instead of the number of degrees if it is desired to do this to prevent confusion. It should be noted that my device does not have to be secured to the shaft 15 in any particular position nor does it require any previous markings on the distributor box 14 in order to secure accurate gauging of the rotation of the shaft 15.

Although the above specification and the accompanying drawing relate to a preferred embodiment of my invention, I do not desire to be limited thereby, for my invention may well be utilized in embodiments other than the preferred embodiment disclosed without departing from the spirit of the invention.

I claim as my invention:

1. As an article of manufacture, a gauge for gauging rotation of a shaft, comprising: a body adapted to be received on said shaft so as to rotate therewith; a cap rotatable on said body; pointer means carried by said cap; and means for gauging rotation of said pointer means relative to said body.

2. As an article of manufacture, a gauge for gauging rotation of a shaft, comprising: a body adapted to be received on said shaft so as to rotate therewith and providing a bore therein; a cap having a pin member thereon rotatably received in said bore; friction means for resisting rotation of said cap relative to said body; adjustable pointer means carried by said cap; and means for gauging rotation of said pointer means relative to said body.

3. As an article of manufacture, a gauge for gauging rotation of a shaft, comprising: a body providing a shoulder between a bore and counterbore therein, said counterbore being adapted to receive said shaft; means for preventing relative rotation between said body and said shaft; a cap having a pin member thereon rotatably received in said bore; friction means engaging said shoulder for resisting rotation of said cap relative to said body; adjustable pointer means carried by said cap; and means for gauging rotation of said pointer means relative to said body.

4. As an article of manufacture, a gauge for gauging rotation of a shaft, comprising: a body adapted to be received on said shaft so as to rotate therewith; a cap rotatable on said body; an adjustable arm carried by said cap; adjustable pointer means on said arm; and means for gauging rotation of said pointer means relative to said body.

5. As an article of manufacture, a gauge for gauging rotation of a shaft, comprising: a body adapted to be received on said shaft so as to rotate therewith; a cap rotatable on said body and having an opening therethrough; an arm slidable in said opening; means for clamping said arm in said opening; pointer means on said arm; and means for gauging rotation of said pointer means relative to said body.

6. As an article of manufacture, a gauge for gauging rotation of a shaft, comprising: a body adapted to be received on said shaft so as to rotate therewith; a cap rotatable on said body; an adjustable arm carried by said cap and having an opening therethrough; a pointer slidable in said opening; means for clamping said pointer in said opening; and means for gauging rotation of said pointer means relative to said body.

7. As an article of manufacture, a gauge for gauging rotation of a shaft, comprising: a body adapted to be received on said shaft so as to rotate therewith; a cap rotatable on said body; an adjustable arm carried by said cap and having an opening therethrough; a pointer slidable in said opening; a nut threaded on said arm and clampingly engaging said pointer; and means for gauging rotation of said pointer means relative to said body.

8. As an article of manufacture, a gauge for gauging rotation of a shaft, comprising: a body adapted to be received on said shaft so as to rotate therewith; a cap rotatable on said body; adjustable pointer means carried by said cap; and said body and cap having angular displacement gauge marks thereon.

9. As an article of manufacture, a gauge for gauging rotation of a shaft, comprising: a body providing a shoulder between a bore and counterbore therein, said counterbore being adapted to receive said shaft; means for preventing relative rotation between said body and said shaft; a cap having a pin member thereon rotatably received in said bore; friction means engaging said shoulder for resisting rotation of said cap relative to said body; an adjustable arm carried by said cap and having an opening therethrough; a pointer slidable in said opening; and said body and cap having angular displacement gauge marks thereon.

10. As an article of manufacture, a gauge for synchronizing the breaker points in a distributor head having a distributor body and a shaft, comprising: a body adapted to be secured to said shaft; a cap rotatable on said body; means for gauging rotation of said cap relative to said body; and pointer means carried by said cap, said pointer means being adjustably approachable to a portion of said distributor body.

11. As an article of manufacture, a gauge for synchronizing the breaker points in a distributor head having a distributor body and a shaft, comprising: a body having a counterbore adapted to receive an end of said shaft; means for retaining said shaft in said counterbore; a cap rotatable on said body; means for gauging rotation of said cap relative to said body; and pointer means carried by said cap, said pointer means being adjustably approachable to a portion of said distributor body.

12. In a gauge for gauging the rotation of a shaft, the combination of, a tubular element of a diameter larger than that of said shaft and mounted thereon, a sleeve interposed between the aforementioned shaft and element, means connecting said element and sleeve for bodily moving both of the latter upon rotation of said shaft, and means for gauging rotary displacement of said shaft.

13. A device for synchronizing the points of a distributor for an internal combustion engine, said distributor including a rotatable shaft and a box having a wall surrounding said shaft, said device comprising: a body adapted to be secured to said shaft for rotation therewith; and means for gauging the rotation of said shaft including a pointer part and a mark part, one of which is supported by said body and rotatable therewith, and the other of which is supported by said wall, said parts cooperating, upon rotation of said shaft, to indicate the amount of rotation thereof.

14. A device for synchronizing the points of a distributor for an internal combustion engine, said distributor including a rotatable shaft and a box having a wall surrounding said shaft, said device comprising: a body adapted to be secured to said shaft for rotation therewith; and means for gauging the rotation of said shaft including a pointer part and a mark part, one of which is supported by said body and rotatable therewith and also rotatable relative to said body, and the other of which is supported by said wall, said parts cooperating, upon rotation of said shaft, to indicate the amount of rotation thereof.

15. A device for synchronizing the points of a distributor for an internal combustion engine, said distributor including a rotatable shaft and a box having a wall surrounding said shaft, said device comprising: a gauging head mounted on said shaft and being rotatable therewith, said gauging head having graduations thereon; and rotation indicating means cooperating between the graduations on said gauging head and said wall whereby the angular rotation of said shaft may be indicated upon rotation of said shaft.

16. A device for synchronizing the points of a distributor for an internal combustion engine, said distributor including a rotatable shaft and a box having a wall surrounding said shaft, said device comprising: a body adapted to be secured to said shaft for rotation therewith; and means for gauging the rotation of said shaft including a pointer part and a mark part, one of which is supported by said body and rotatable therewith, and the other of which is supported by said wall, said parts being relatively adjustable to permit the device to be arranged in a starting position, and said parts cooperating, upon rotation of said shaft, to indicate the amount of rotation thereof.

17. A device for synchronizing the points of a distributor for an internal combustion engine, said distributor including a rotatable shaft and a box having a wall surrounding said shaft, said device comprising: a gauging head mounted on said shaft and being rotatable therewith, said gauging head having graduations thereon; and rotation indicating means cooperating between the graduations on said gauging head and said wall whereby the angular rotation of said shaft may be indicated upon rotation of said shaft, said rotation indicating means being adjustable to permit said device to be set in a starting position independently of said shaft.

WALTER T. BALLOU.